United States Patent [19]

Suzuki et al.

[11] Patent Number: 4,472,710
[45] Date of Patent: Sep. 18, 1984

[54] SPATULA-SHAPED LIGHT PEN

[75] Inventors: Kazuo Suzuki; Yoshio Arai, both of Kanagawa, Japan

[73] Assignee: Fuji Xerox Co., Ltd., Tokyo, Japan

[21] Appl. No.: 345,511

[22] Filed: Feb. 4, 1982

[30] Foreign Application Priority Data

Feb. 10, 1981 [JP] Japan .................................. 56-17541

[51] Int. Cl.³ ............................................. G09G 1/00
[52] U.S. Cl. .................................. 340/707; 340/708; 235/472; 382/59
[58] Field of Search ....................... 340/706, 707, 708; 250/208, 209, 578, 237 R; 235/472; 382/59; 178/18, 19

[56] References Cited

U.S. PATENT DOCUMENTS

| | | | |
|---|---|---|---|
| 3,505,666 | 4/1970 | Thorpe | 340/707 |
| 3,680,078 | 7/1972 | Baskin et al. | 340/707 |
| 3,758,717 | 9/1973 | Granzotti | 340/707 |
| 3,825,746 | 7/1974 | Kendler et al. | 340/707 |
| 3,918,028 | 11/1975 | Humphrey et al. | 235/472 |

Primary Examiner—Gerald L. Brigance
Attorney, Agent, or Firm—Sughrue, Mion, Zinn, Macpeak and Seas

[57] ABSTRACT

A light pen is provided with an elongated or spatula-shaped light receiving end which houses a plurality of optical fiber tubes in either a linear or two-dimensional array. The device is useful for simultaneously reading the coordinates of a plurality of points within a single scan period of a CRT image produced using the NTSC system. A slideable light interceptor may be provided in the operator of the light pen so as to limit the size or the proportion of the array receiving incident light.

4 Claims, 5 Drawing Figures

SPATULA-SHAPED LIGHT PEN

BACKGROUND OF THE INVENTION

This invention relates to a spatula-shaped light pen for controlling an image displayed on a CRT (cathode ray tube) screen.

Light pens have previously been used to control an image displayed on a CRT screen. However, for instance, in the case where the NTSC system is employed and an image is displayed on the CRT screen with a refresh time of about 1/60 second, the conventional light pen can read the coordinates of only one position in one field time (about 1/60 second).

Therefore, the conventional light pen is disadvantageous when the light pen is required to control a region. If it is assumed that the region consists of n points, it takes n×1/60 seconds for the light pen to control the region, because n points must be controlled with the light pen one after another.

SUMMARY OF THE INVENTION

An object of this invention is thus to improve the structure of the conventional light pen. More specifically, an object of the invention is to provide a spatula-shaped light pen in which the above-described difficulty accompanying the conventional light pen can be eliminated, and which can read the coordinates of a plurality of points simultaneously in one CRT field refresh time.

The foregoing objects of the invention have been achieved by the provision of a spatula-shaped light pen, which, according to the invention, is provided with a plurality of optical fiber tubes.

BRIEF DESCRIPTION OF THE DRAWINGS

One embodiment of this invention will be described with reference to the accompanying drawings, wherein.

DETAILED DESCRIPTION OF THE PREFERRED EMBODIMENTS

Figure 1:
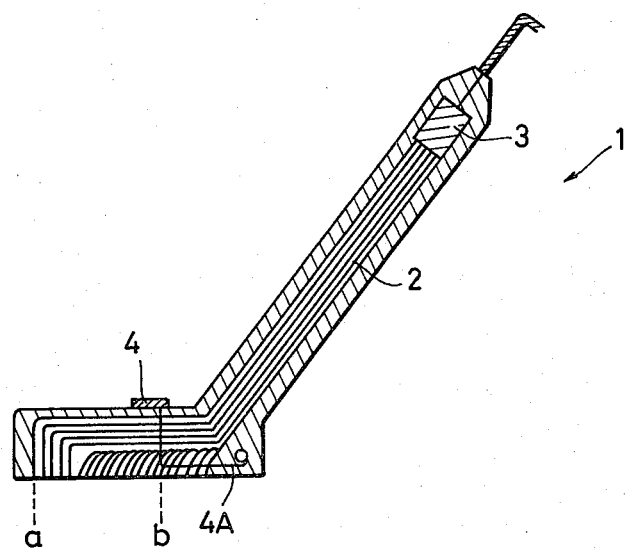
FIGS. 1, 2 and 3 are a sectional view, a plan view and a bottom view of one example of a spatula-shaped light pen according to this invention, respectively.
Figure 2:
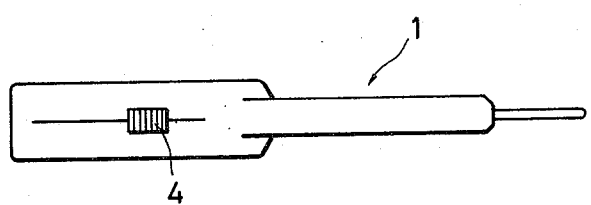
Figure 3:
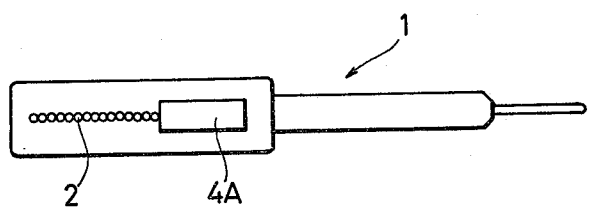

FIG. 1 is a sectional view of one example of a spatula-shaped light pen according to the invention, FIG. 2 is a plan view of the light pen, and FIG. 3 is a bottom view of the same. In these figures, reference numeral 1 designates the light pen; 2, a plurality of optical fiber tubes, which, on the bottom of the light pen 1 are arranged in one longitudinal line; 3, a light receiving element with a light receiving surface connected to the optical fiber tubes; and 4, a slide knob for adjusting the read region which extends from the upper end point a (or the start point) to the lower end point b (or the end point) of the optical fiber tubes 2. As the slide knob 4 is moved to the left in FIG. 1, its light intercepting plate 4A is moved so as to intercept light incident upon some of the optical fiber tubes 2.

Figure 4:
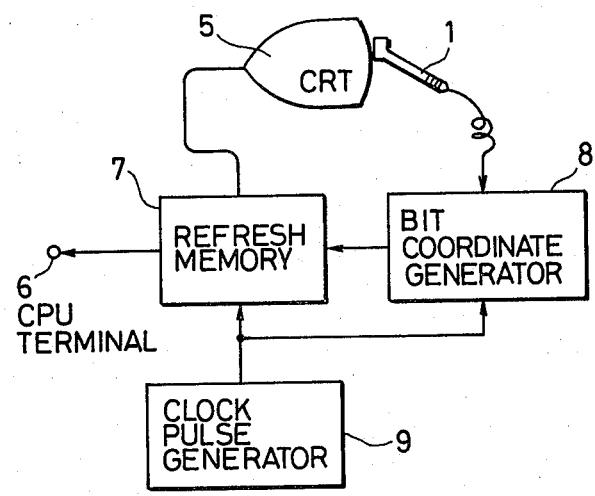
FIG. 4 is a block diagram illustrating one application of the light pen according to the invention.

FIG. 4 is a block diagram showing one application of the spatula-shaped light pen according to the invention. In FIG. 4, reference numeral 1 designates the spatula-shaped light pen according to the invention, while a CRT (cathode ray tube) 5, an external CPU (central processing unit) connecting terminal 6, a refresh memory 7, a bit coordinate generator 8, and a clock pulse generator 9 complete the arrangement.

The image reading operation with the spatula-shaped light pen on the CRT will be described with reference to FIG. 5.

Figure 5:
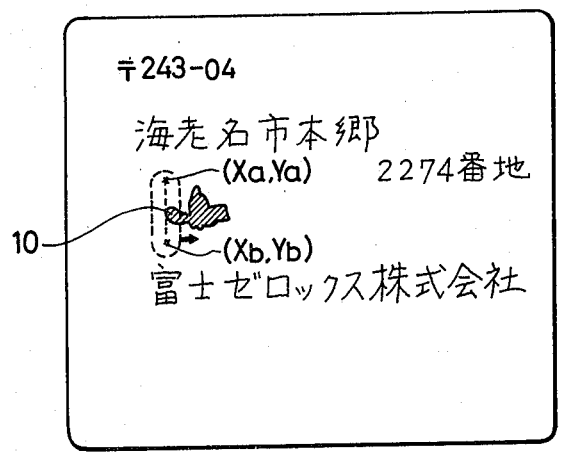
FIG. 5 is an explanatory diagram showing an image on the CRT of FIG. 4.

When image data are transmitted to the refresh memory 7 through the external CPU connecting terminal 6, an image such as that shown in FIG. 5, for example, is displayed on the CRT 5.

If, in this case, the image includes noise 10 which should be erased, the slide knob 4 is moved so that the upper end of the read region of the light pen 1, i.e., the point a, corresponds to the upper end (having coordinates Xa, Ya) of the noise 10 and the lower end of the read region, i.e., the point b, corresponds to the lower end (having coordinates Xb, Yb) of the noise 10; in other words, the slide knob 4 is adjusted so as to cover the vertical region of the noise 10.

In the first image reading operation with the spatula-shaped light pen 1, the coordinates of a plurality of continuous points from the upper end (Xa, Ya) to the lower end (Xb, Yb) are read by the bit coordinate generator 8, and image data corresponding to the coordinates thus read are erased from the refresh memory 7. Next, the spatula-shaped light pen 1 is moved to the right, to erase the noise 10 successively.

The image data, from which the noise 10 has been eliminated as described above, are transferred to the external CPU through the terminal 6. The clock pulse generator 9 operates to generate a refresh signal for the CRT image. More specifically, the clock pulse generator 9 supplies an image data read signal to the refresh memory 7, and applies addresses corresponding to the CRT screen to the bit coordinate generator 8.

In the above-described embodiment, a plurality of optical fiber tubes are arranged in one longitudinal line; however, it goes without saying that they may be arranged in one lateral line or two-dimensionally.

The foregoing embodiment has been described with reference to the case where an image is erased. However, it should be noted that designation in units of line and/or column can be readily carried out with the spatula-shaped light pen. Therefore, it is obvious that the light pen can be used to edit sentences displayed on the CRT.

The spatula-shaped light pen according to the invention has a plurality of optical fiber tubes as was described above. Therefore, the coordinates of a plurality of points can be read simultaneously in one CRT field refresh time. Accordingly, the spatula-shaped light pen has the advantage that image indication can be achieved within a short period of time.

What is claimed is:

1. A spatula-shaped light pen, comprising:
   (a) at least three optical fibers (2) having light receiving ends arranged in a generally elongate array;
   (b) a light receiving element (3) having a light receiving surface operatively coupled to opposite ends of said optical fibers; and
   (c) a selectively adjustable light intercepting plate (4A) movably disposed over the light receiving ends of said optical fiber for intercepting light incident upon said array.

2. A light pen as claimed in claim 1, wherein said array is a linear array.

3. A light pen as claimed in claim 1, wherein said array is a two dimensional array, at least one dimension of which may be covered by said light intercepting plate.

4. A light pen as claimed in claim 1, further comprising bit coordinate generator means for reading coordinates of a plurality of continuous points selected with said light pen, external CPU means and refresh memory means for receiving image data from said CPU and transmitting image data thereto and receiving an output of said bit coordinate generator means, wherein image data corresponding to said read coordinates may be altered in said refresh memory means.

* * * * *